(12) United States Patent
Bradfield

(10) Patent No.: US 7,417,344 B2
(45) Date of Patent: Aug. 26, 2008

(54) ELECTRONIC PACKAGE FOR ELECTRICAL MACHINE

(75) Inventor: Michael D. Bradfield, Anderson, IN (US)

(73) Assignee: Remy International, Inc., Anderson, IN (US)

( * ) Notice: Subject to any disclaimer, the term of this patent is extended or adjusted under 35 U.S.C. 154(b) by 0 days.

(21) Appl. No.: 11/749,330

(22) Filed: May 16, 2007

(65) Prior Publication Data

US 2007/0210662 A1    Sep. 13, 2007

Related U.S. Application Data

(62) Division of application No. 11/217,639, filed on Sep. 1, 2005.

(60) Provisional application No. 60/606,348, filed on Sep. 1, 2004.

(51) Int. Cl.
H02K 5/16 (2006.01)

(52) U.S. Cl. .......................... 310/90; 384/476

(58) Field of Classification Search ............ 29/898.047, 29/898.054, 898.059; 384/903, 905; 310/89, 310/90
See application file for complete search history.

(56) References Cited

U.S. PATENT DOCUMENTS

| | | | |
|---|---|---|---|
| 3,496,394 A | | 2/1970 | Reichelt et al. |
| 3,532,402 A | * | 10/1970 | Templeton et al. .......... 384/557 |
| 4,228,210 A | * | 10/1980 | Scribner ...................... 428/131 |
| 4,429,927 A | * | 2/1984 | Kawabata .................... 384/585 |
| 4,606,000 A | | 8/1986 | Steele et al. |
| 5,059,042 A | * | 10/1991 | Grierson ...................... 384/537 |
| 5,451,823 A | | 9/1995 | Deverall et al. |
| 5,744,892 A | | 4/1998 | Mukai et al. |
| 5,780,953 A | | 7/1998 | Umeda et al. |
| 5,977,669 A | | 11/1999 | Yoshida et al. |
| 6,486,580 B1 | * | 11/2002 | Cenzer et al. .................. 310/90 |
| 6,754,946 B2 | | 6/2004 | Nguyen |
| 6,774,518 B2 | * | 8/2004 | Howe et al. .................... 310/89 |
| 7,217,106 B2 | * | 5/2007 | Tanaka et al. ............. 417/410.1 |
| 2005/0006975 A1 | | 1/2005 | Bradfield |

FOREIGN PATENT DOCUMENTS

JP        1-286755       11/1989

* cited by examiner

*Primary Examiner*—Burton Mullins
(74) *Attorney, Agent, or Firm*—Cantor Colburn LLP

(57) ABSTRACT

Disclosed herein is an electronic package for an electrical machine including a slip ring end frame; a plurality of negative diodes dispersed in an angular fashion in the SRE frame acting as a negative heat sink; a plurality of positive diodes mounted on a separate electrically conductive plate located above a location of the plurality of negative diodes; a non-conductive separator fitted over a series of bosses, configured to electrically insulate; a terminal assembly configured to make appropriate electrical connections between the positive and negative diodes, stator phase leads, and a regulator, which is operably fastened to the SRE frame at a plurality of locations, the regulator electrically connects to the positive heat sink, a stator phase terminal extending from the terminal assembly, SRE frame, and a brush holder; wherein the regulator is perpendicular to the SRE frame.

4 Claims, 12 Drawing Sheets

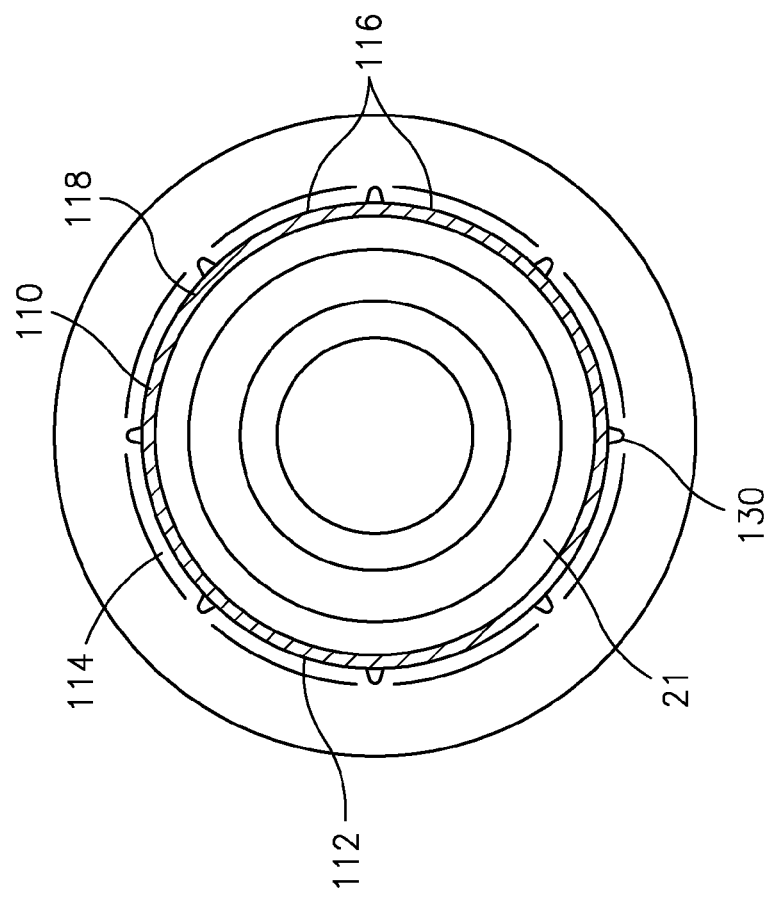
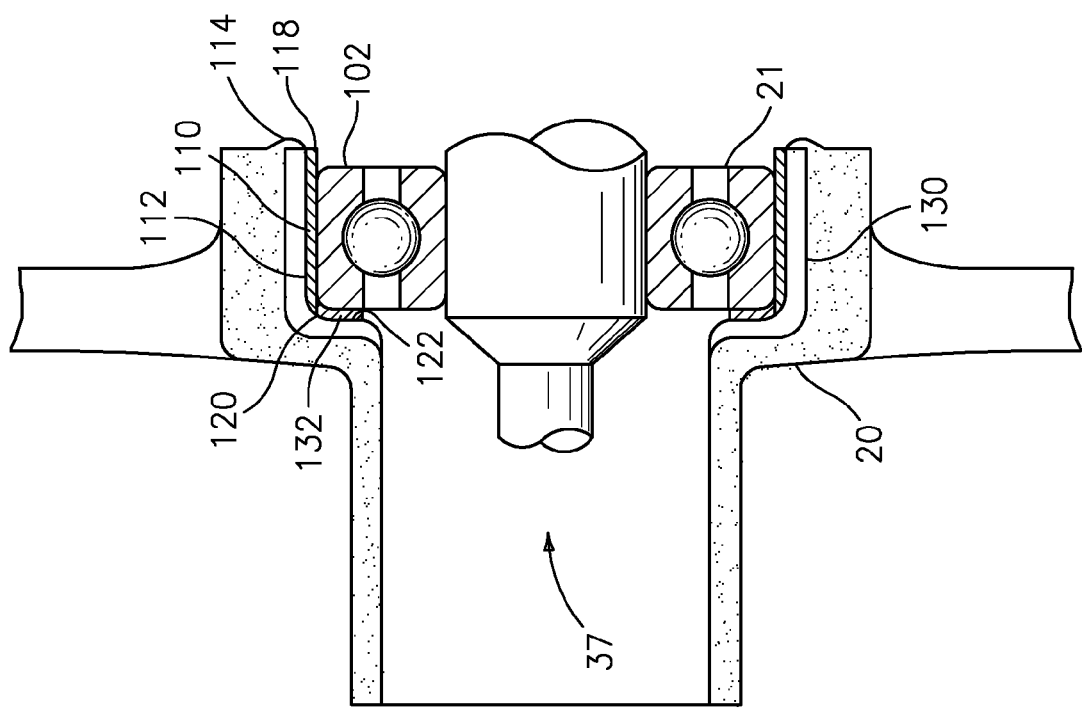

ELECTRONIC PACKAGE FOR ELECTRICAL MACHINE

CROSS REFERENCE TO RELATED APPLICATION

This application is a divisional application of the U.S. Ser. No. 11/217,639 filed Sep. 1, 2005, the contents of which are incorporated by reference herein in their entirety. This application claims the benefit of U.S. Provisional Application No. 60/606,348 filed Sep. 1, 2004 the contents of which are incorporated by reference herein in their entirety.

TECHNICAL FIELD

This application relates generally to an electrical apparatus. More specifically, this application relates to an electronic component package having a diode rectifier bridge, regulator, and brush holder assembly for a compact electrical machine having improved cooling characteristics.

BACKGROUND

Electrical loads for vehicles continue to escalate. At the same time, the overall package size available for the electrical generator continues to shrink. Consequently there is a need for a higher power density system and method of generating on-board electricity.

The increase in the demand for current to be produced by an alternator leads to a need for corresponding adaptation of the system for current regulation, and particularly of a system whereby the three-phase alternating current produced by an alternator is rectified, into a direct current, which can be stored in a battery of a vehicle or be used directly by the electrical circuit of the vehicle which is supplied with a direct current (DC) voltage.

Rectification of the three-phase alternating current is generally obtained by means of a rectifier bridge having between six and twelve power diodes depending on the application. Three of these diodes in a six diode configuration are the positive diodes, and are connected between the phase terminals of the stator windings of the alternator and the positive terminal B+ of the alternator which is connected to the battery and the electrical circuit of the vehicle. Three further diodes, namely the negative diodes, are connected between electrical ground or earth of the vehicle and the aforementioned phase terminals of the stator windings.

The diodes constitute the rectifier bridge and are subjected to high current. Hence, it is necessary to cool them in the most effective way possible. To this end, it is know to install the diodes on metal carrier plates, which are located on the outside of the alternator and which constitute a dissipator for the heat produced by the diodes. The diodes are grouped on two carrier plates, one of which is reserved for the positive diodes, and the other for the negative diodes.

The rectifier diodes are collected to respective metal carrier plates, and these carrier plates are used as heat sinks for these diodes as well. The rectifier diodes are inserted by pressure in receiving bore holes of the metal carrier plate or heat sink, or are soldered to the metal carrier plate using appropriate solder alloys. The end wires connected to the rectifier diodes enable the rectifier diodes to be connected to external sources.

However, under certain particularly severe operating conditions, it has become apparent that this cooling of the diodes, and in general terms the cooling of the whole of the current regulating means, can be insufficient to ensure long-term reliability of the alternator.

The heat sinks are typically constricted in the shape of a circle or crescent and are fastened in the same plane to the alternating current generator.

It is important that the bridge rectifiers must not only be able to withstand normal battery charging current, but must also be able to supply current, perhaps as much as ten times the normal charging current. Bridge rectifiers, as discussed, are typically unable to absorb or conduct these types of excess currents and are also unable to rapidly dissipate the resulting heat. In order for bridge rectifiers to handle these types of excessive currents and heat, it becomes necessary to utilize a bridge rectifier which has a higher current handling capability. Due to the space limitations of the alternating current generator, it then becomes very difficult to provide such a bridge rectifier from a feasibility standpoint as well as at an economical cost.

Increasing the current capacity and heat dissipating characteristics of the bridge rectifier has included mounting of semiconductor diode chips onto first and second metallic heat sinks which are electrically insulated from each other by a thin sheet of electrical insulating material. The diode chips are then covered by a protective insulating coating after connection to the respective heat sink. One of the metallic heat sinks includes a finned area which is subjected to cooling air when the bridge rectifier is mounted to the generator. The heat sink with the plurality of fins includes twelve air passages. This type of bridge rectifier is shown in U.S. Pat. No. 4,606,000 to Steele et al., incorporated herein by reference.

However, this type of approach involves separate electronic packages for alternators of various sizes, e.g., six diodes vs. twelve diodes, and between light duty and heavy duty or off-road applications. For example a twelve diode rectifier cannot fit on a 114 mm diameter alternator designed for six diodes without the rectifier extending beyond the body of the machine. In addition, a six diode configuration does not have the flexibility to adapt to the thermal cooling requirements of a twelve diode rectifier or have brush lengths to match a given application.

Accordingly, there is a desire for an electronic package that can be used on small to large alternators (e.g., between about 114 mm to about 150+ mm stator diameter), six and twelve diode applications, and light duty and heavy duty applications. Moreover, there is a desire for an electronic package having a common footprint with a common layout and fastener locations.

On a typical alternator, a rotor shaft is supported in a drive end frame assembly by a front bearing and in a slip ring end (SRE) frame assembly by a rear bearing. The rear bearing includes an outer race fabricated of steel which is assembled with the slip ring end frame assembly fabricated of aluminum. Since steel and aluminum have different coefficients of thermal expansion (CTE), the fit between the outside diameter (OD) of the steel bearing and the inside diameter (ID) of the mating aluminum SRE frame housing the steel bearing changes with temperature. The size of the bearing OD and range of temperatures are such that having a direct press-fit between the bearing and SRE frame assembly will result in either having a radial press that is too high, and hence stress at this interface, at one temperature extreme, or a completely loose fit at the other extreme. Another requirement of this interface is that it must allow the bearing outer race to move axially allowing relative axial movement of the steel rotor shaft relative to the aluminum housing.

Currently, there are two general approaches to retain the rear bearing with the SRE frame assembly. One approach includes using a plastic material between the OD of the outer race of the bearing and the ID of the SRE frame assembly.

Plastics have a greater coefficient of thermal expansion than aluminum and can effectively compensate for the radial mismatch between the aluminum and steel over the operating temperatures. Plastic, however, presents its own problems with respect to applied loads, elevated temperature, and time. Plastic creeps causing problems with radial alignment between the rear bearing and SRE frame assembly. Plastic also presents a thermal barrier to the outer race of the bearing preventing effective thermal conductance to the aluminum SRE frame assembly.

The other approach includes using a steel cup intermediate the bearing and the SRE frame assembly. However, because of the mismatch in thermal expansion between the steel cup and aluminum SRE frame assembly, the steel retaining cup typically includes multiple legs extending radially outward. These legs are then attached to the SRE frame assembly through threaded fasteners or similar features. Although effective from a product standpoint, such an arrangement is costly.

There is a need to improve the performance characteristics of prior art bridge rectifiers. In addition, there is a need for a SRE frame assembly interface with the rear bearing which increases the dissipation of heat from the rear bearing and more efficiently cool the rear bearing while limiting road splash at this interface. Furthermore, a more robust package assembly capable of assembly with six or twelve diodes while providing effective thermal dissipation of the rear bearing that is also cost effective is accordingly desired.

BRIEF SUMMARY OF THE INVENTION

Disclosed herein is an electronic package for an electrical machine including a slip ring end (SRE) frame, having a first face and a second face, defining one end of a housing supporting a rotor therein so as to be rotatable; a plurality of negative diodes dispersed in an angular fashion in the SRE frame acting as a negative heat sink; a plurality of positive diodes mounted on a separate electrically conductive plate located adjacent a location of the plurality of negative diodes, the plate being configured as a positive heat sink having corresponding holes such that leads extending from each negative diode protrude directly therethrough and openings formed in the positive heat sink to engage a body of each positive diode; a non-conductive separator fitted over a series of bosses that space the positive heat sink above a top surface defining the negative heat sink, the separator configured to electrically insulate the positive heat sink and negative heat sink from one another; a terminal assembly configured to make appropriate electrical connections between the positive and negative diodes, stator phase leads, and a regulator; and the regulator, having a first side and a second side, is operably fastened to the SRE frame at a plurality of locations, the regulator electrically connects to the positive heat sink, a stator phase terminal extending from the terminal assembly, SRE frame, and a brush holder; wherein each of the regulator first and second sides are perpendicular to each of the SRE frame first and second faces.

Further disclosed herein is an electronic package for an electrical machine including a slip ring end (SRE) frame defining one end of a housing configured for mounting a rotor therein so as to be rotatable, the SRE frame having a cast wall along an inside diameter; a plurality of slip rings positioned on the shaft; a plurality of negative diodes dispersed in an angular fashion in the SRE frame acting as a negative heat sink; a plurality of positive diodes mounted on a separate electrically conductive plate, having stamped fins on an outer diameter, located above a location of the plurality of negative diodes, the plate being configured as a positive heat sink having corresponding holes such that leads extending from each negative diode protrude directly therethrough and openings formed in the positive heat sink to engage a body of each positive diode; a non-conductive separator fitted over a series of bosses that space the positive heat sink above a top surface defining the negative heat sink, the separator configured to electrically insulate the positive heat sink and negative heat sink from one another; a terminal assembly configured to make appropriate electrical connections between the positive and negative diodes, stator phase leads, and a regulator; the regulator is operably fastened to the SRE frame at a plurality of locations, the regulator electrically connects to the positive heat sink, a stator phase terminal extending from the terminal assembly, SRE frame, and a brush holder assembly; and, the brush holder assembly further comprising a plurality of brushes wherein the cast wall of the SRE frame surrounds the plurality of slip rings and the plurality of brushes.

Yet further disclosed herein is a bearing package for an electrical machine including a slip ring end (SRE) frame defining one end of a housing configured for mounting a rotor therein so as to be rotatable, said SRE frame having a bearing bore configured therein; a bearing having an outer race and an inner race, said inner race operably coupled with a rotor shaft of the rotor; and a steel retaining ring intermediate the bearing bore of the SRE frame and the outer race, the steel retaining ring retained in said bearing bore by one of spinning over and staking over a portion of an edge defining the bearing bore on a corresponding portion of an exposed edge defining the steel retaining ring.

BRIEF DESCRIPTION OF THE DRAWINGS

Referring to the exemplary drawings wherein like elements are numbered alike in the accompanying Figures:

FIG. 16 is a cross section view of a SRE frame assembly including an outer race of a bearing retained therewith using a steel ring and an optional wave washer; and, FIG. 17 is a top plan view of the SRE frame assembly of FIG. 16 illustrating a plurality of channels cast in the SRE frame circumferentially about the outer race to allow fresh air into a slip ring region.

DESCRIPTION OF THE PREFERRED EMBODIMENT

Figure 1:
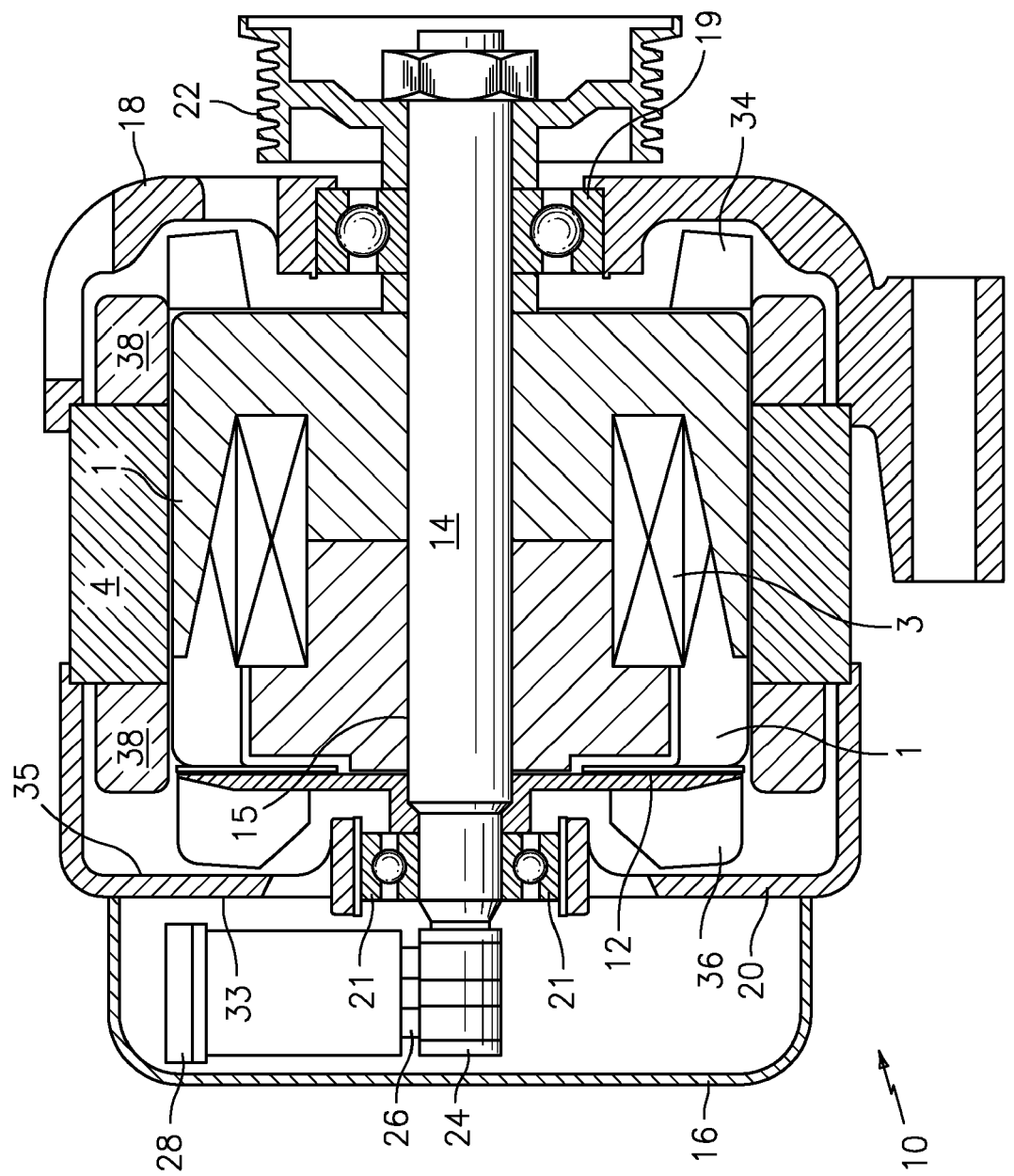
FIG. 1 is a sectional view of an electric machine for use in accordance with the present invention.

FIG. 1 illustrates an exemplary rotor assembly 15, containing several components including a shaft 14, a field winding 3 surrounding a core (not shown), and pole segments 1, disposed in an electric machine 10 that operates as an alternator in an exemplary embodiment, and is constructed by rotatably mounting a claw-pole rotor or the rotor assembly 15 by means of the shaft 14 inside a case 16 constituted by a front bracket or drive end frame 18 and a rear bracket or slip ring end (SRE) frame 20, which may be made of aluminum, and fixing a stator 4 to an inner wall surface of the case 16 so as to cover an outer circumferential side of the rotor assembly 15. This type of electric machine is shown in U.S. Patent Publication No. 2005/0006975, filed on Nov. 14, 2003, the contents of which are incorporated by reference herein in their entirety.

The shaft 14 is rotatably supported in the front bracket 18 via a first bearing 19 and the rear bracket 20 via a second bearing 21. A pulley 22 is fixed to a first end of this shaft 14, enabling rotational torque from an engine to be transmitted to the shaft 14 by means of a belt (not shown).

Slip rings 24 for supplying an electric current to the rotor assembly 15 are fixed to a second end portion of the shaft 14, a pair of brushes 26 being housed in a brush holder 28 disposed inside the case 16 so as to slide in contact with the slip rings 24. A voltage regulator (not shown) for adjusting the magnitude of an alternating voltage generated in the stator 4 is operably coupled with the brush holder 28. Still referring to FIG. 1, a first fan 34 and a second fan 36 are fixed to first and second axial ends of the rotor assembly 15. Front-end and rear-end air intake apertures (not shown) are disposed in axial end surfaces of the front bracket 18 and the rear bracket 20, and front-end and rear-end air discharge apertures (not shown) are disposed in first and second outer circumferential portions of the front bracket 18 and the rear bracket 20 preferably radially outside front-end and rear-end coil end groups of the armature winding 38 installed in the stator core 4.

Figure 2:
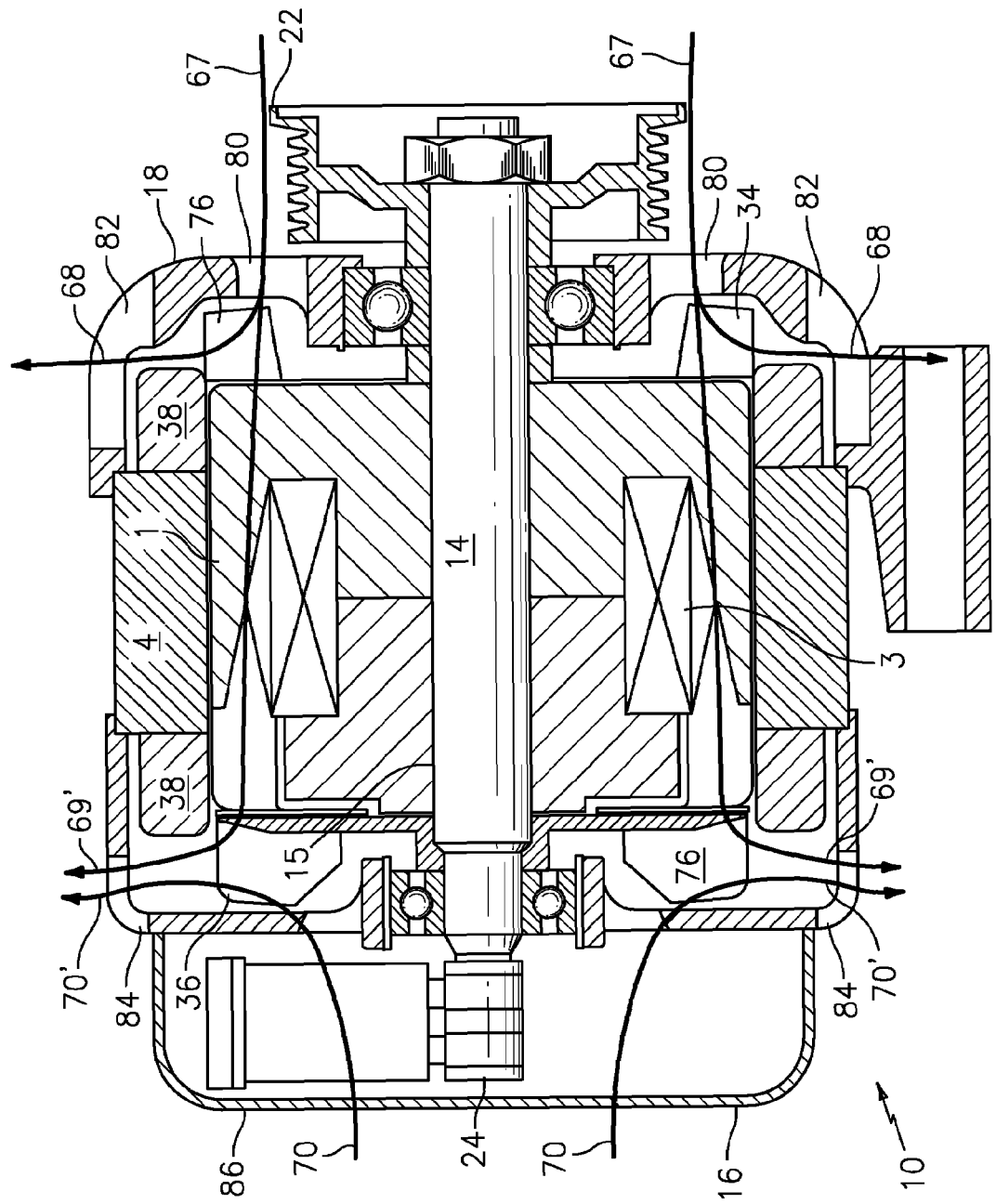
FIG. 2 is the sectional view of an electric machine of FIG. 1 illustrating a twin internal fan configuration and airflow resulting therefrom in accordance with an exemplary embodiment.

Along with the electrical load escalation, is a continuing customer demand for lower emitted noise. To address the mechanical noise emitted from the electric machine 10 depicted in FIG. 1 and reproduced in FIG. 2, the cooling arrangement thereof includes a dual internal fan configuration, (i.e., fans 34 and 36). With this configuration the first fan 34 is placed on the drive end side of the rotor assembly 15 and the second fan 36 is placed on the slip ring end (SRE) side of the rotor assembly 15. The fans 34 and 36 are located within the housing 16 of the electric machine 10 and hence the dual internal fan designation. The drive end, or first, fan 34 pulls air axially into the electric machine 10 generally shown with arrows 67. At the drive end fan 36 location, this flow splits and part of the air is exhausted primarily in a radial direction indicated with arrows 68 while another part of the flow continues in an axial direction 69 and then exits out on the opposite side of the stator 4 on the SRE side generally shown at 69'. On the SRE side proximate slip rings 24, air is drawn axially into the back of the electric machine 10 by the second fan 36 in an axial direction indicated generally with arrows 70 and then exhausts primarily in a radial direction indicated generally with arrows 70'.

The present dual internal fan configuration described above diminishes the airflow noise without reducing airflow to an undesirable level. With regard to the operation of the alternating current generator of the above construction, when the rotor 15 is rotated by an external driving force via pulley 22, a magnetic field generated by the field winding 3 surrounding the field core, and the magnetic field passes through the stator winding 38 in conformance with the rotation of the rotor 15. In this manner, current is generated in the stator winding 38 and a power is generated through rectifier 40 (shown in FIG. 3).

Furthermore, when the rotor 15 is rotated, the fans 34 and 36 fixed to the shaft 14 are rotated together with the field core, and blades 76 defining cut-raised portions extending from the fans 34 and 36, are also rotated to produce air flow inside the electric machine 10.

The air flows may be principally divided into flows 67, 68, 69, and 69' or flows 70 and 70' as described above. Flows 67, 68, 69, and 69' represent air flowing in through an inlet port 80 of front bracket 18, passing through the coil end of the stator winding 38, and splitting to exhaust primarily in a radial direction (i.e., 68) out of an outlet port 82 of the front bracket 18 and remaining portion of air flow continuing in an axial direction (i.e., 69) flowing out through an outlet port 84 of the rear bracket 16.

Flows 70 and 70' represent air flowing in through an inlet port 86 of rear bracket 16, passing through the rectifier 40 and brush 26, and flowing out through outlet port 84 of rear bracket 16. The inside of the electric machine 10 is cooled by these air flows.

Generally, the heat produced within the electric machine 10 is dependent upon the losses within the electric machine 10 which in turn is dependent upon the output. Whereas the cooling air flow rate produced by the fans 34 and 36 is increased in proportion to the rpm while the wind noise is also increased. In this regard, the temperature rise value of every part inside the electric machine 10 cooled by the fans 34 and 36 is dependent upon a relation between the output and air flow rate. By combining an electronic package as described above and bearing arrangement with a dual internal fan configuration into one common electrical machine, output current capability is increased while emitted air noise is decreased. Furthermore, such an arrangement for the field rotor (i.e., claw pole with three segments) produces a stronger rotating magnetic field and allows an axial length of the stator to be more effectively lengthened.

Referring to the Figures, an exemplary embodiment of a rectifier assembly 40 configured for six to twelve diodes for converting alternating current (AC), produced by an electric machine, into direct current (DC) is shown. An electronic package layout for the electric machine 10 is generally described. The electronic package includes rectifier assembly 40, regulator assembly 42, and a brush holder 28.

Figure 3:
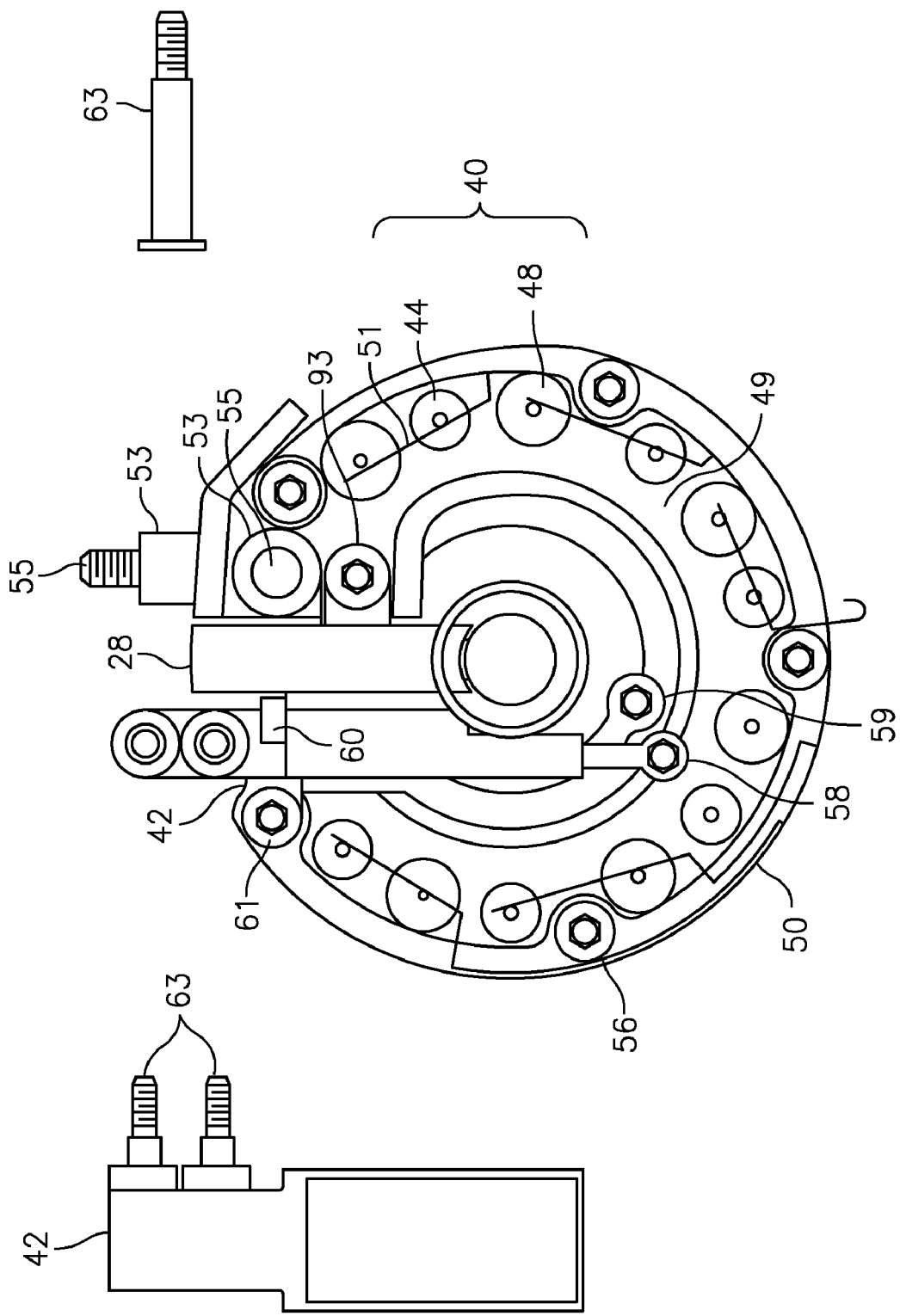
FIG. 3 includes a side view of regulator (42) a top plan view of an electronic package having regulator (42) and a side view of a stud connector removed from regulator (42)
Figure 15:
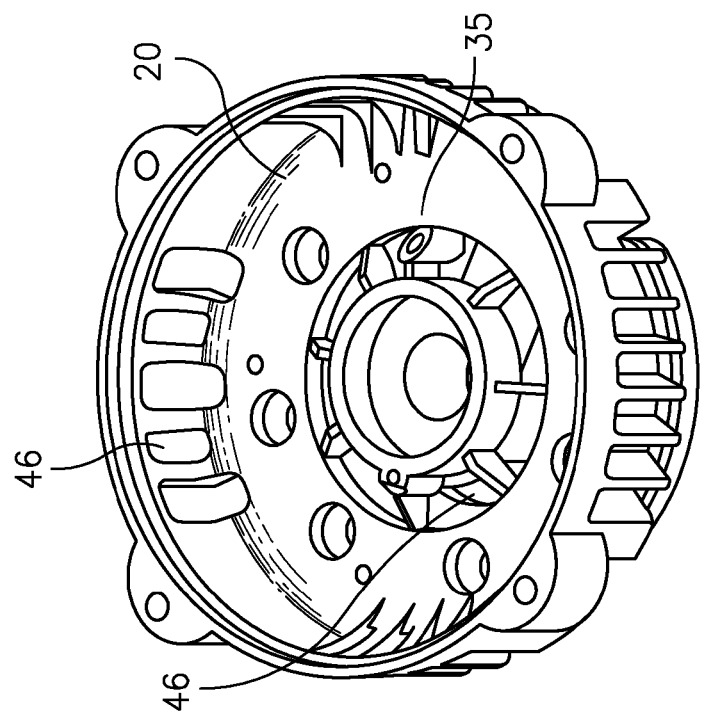
FIGS. 14 and 15 includes a top plan view and a bottom perspective view, respectively, of the assembled rectifier assembly of FIGS. 13 and 14 illustrating cooling vents in the negative heat sink or SRE frame.
Figure 14:
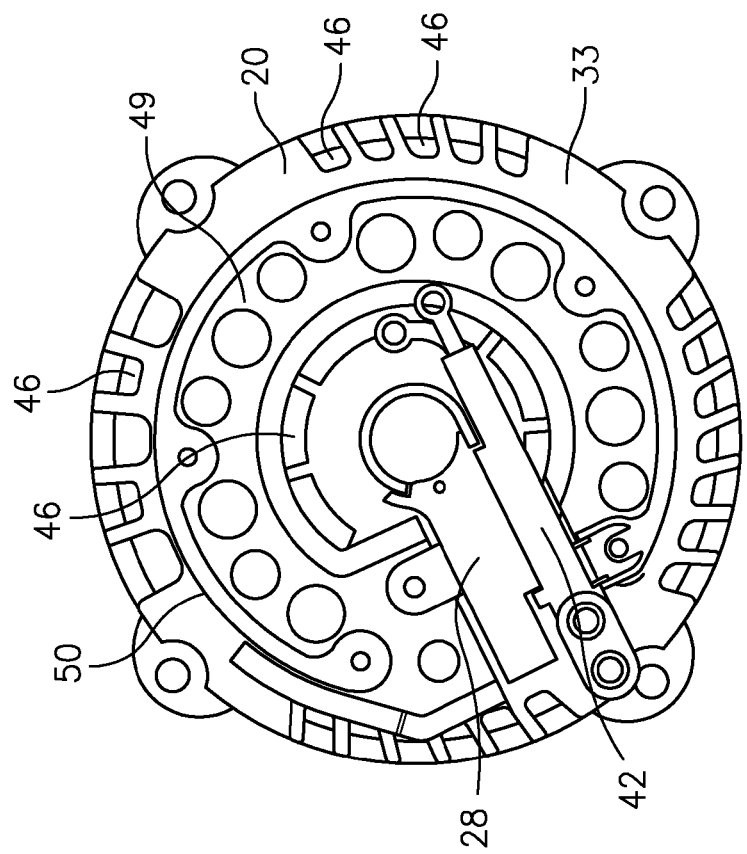

Referring now to FIG. 3, a plan view of an exemplary embodiment of a bridge rectifier 40 is illustrated. The rectifier 40 includes the slip ring end (SRE) frame 20 of the electric machine 10 (not shown) having six negative diodes 44 disposed therewith. The SRE frame 20 is preferably cast aluminum, but other materials are contemplated. The SRE frame 20 includes a first face 33 and a second face 35, as illustrated in FIG. 1. The six negative diodes 44 are mounted directly in contact with the SRE frame 20 of the electric machine 10. The diodes 44 are dispersed in an angular fashion and spaced from each other in a complementary configured aperture preferably allowing press-fit assembly. The SRE frame 20 is configured as a structural, electrically and thermally conductive element (e.g., a negative heat sink of the rectifier assembly 40. A plurality of vents 46 are concentrically disposed radially inward and outward of the diodes 44 forming an arc (as best seen in FIGS. 14 and 15) between diodes 44.

Figure 8:
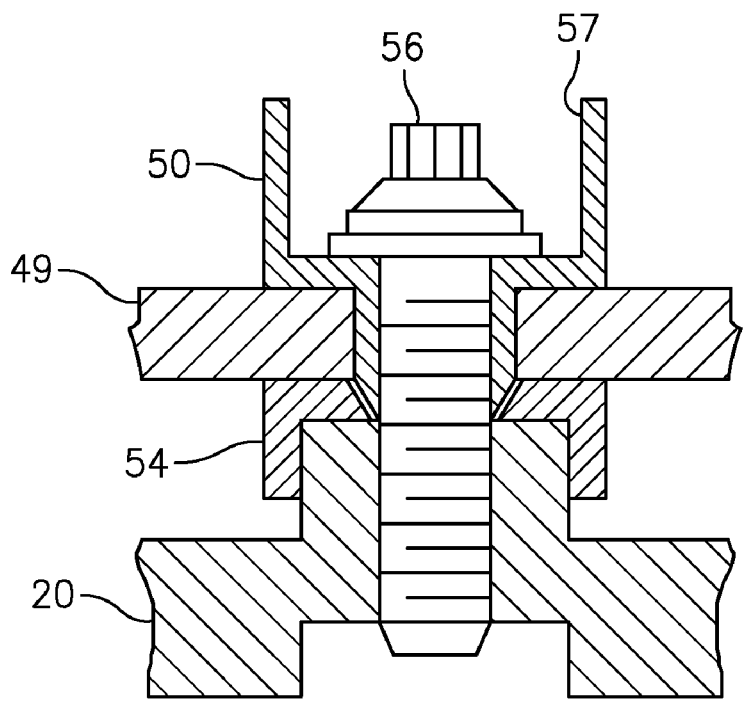
FIG. 8 is a cross section view of a positive heat sink insulated from a negative heat sink perspective with a separator therebetween and secured with one another using a common fastener (56)

Six positive diodes 48 are mounted on a separate electrically conductive plate 49 that is located directly adjacent a location of the six negative diodes as illustrated in FIGS. 3 and 8. The plate 49 is preferably configured as a positive heat sink having corresponding holes, such that leads extending from the negative diodes 44 protrude directly through a corresponding hole and are properly positioned with respect to a terminal assembly 50 for electrical connection therewith (as best seen in FIGS. 3 and 6). The plate 49 may be configured with a plurality of fins 52, illustrated in FIG. 5, extending therefrom for cooling. In an exemplary embodiment as illustrated, the fins 52 are stamped into an outside edge defining the plate 49 wherein all other features of the plate 49 remain the same as the non-finned embodiment of the plate 49, which allows for the thermal capacity of the rectifier 40 to increase when used on larger machines with higher output currents without reconfiguring the electronics package. A cylindrical wall formed in the positive heat sink or plate 49 defining each corresponding hole surrounds each of the positive diodes 48. The cylindrical wall is preferably configured to allow press-fit assembly of each of the corresponding positive diodes 48 therein. The cylindrical wall is optionally dimensioned and configured to increase the surface area of contact with the diode 48 to increase heat conduction from the diode 48 and increase heat dissipation from the cylindrical wall. The plate 49 is preferably made of aluminum, and more preferably with 1100 aluminum alloy, however, other suitable conductive materials are also contemplated.

Referring now to FIGS. 3 and 8, to electrically isolate the plate 49 from the SRE frame 20 that is at ground potential, a non-conductive separator 54 is fitted over a series of bosses that space the plate 49 above a top surface defining the SRE frame 20. The separator 54 is configured as a phase lead insulator for the stator 4 (not shown) to insulate the stator 4 wires that protrude through the SRE frame 20 which is at ground potential. The separator 54, which is a molded plastic component, electrically separates the plate 49 from ground, the negative diodes 44 that are pressed into the rear frame 20, the positive diodes 48 that are pressed into the plate 49, and a B+ stud 55 and a spacer 53 that are attached to the plate 49 in either a radial or axial orientation (see FIGS. 3 and 6).

Referring again now to FIG. 3, the appropriate electrical connections between the diodes 44 and 48, the stator 4 phase leads, and the regulator 42 are made through the use of the terminal assembly 50. The terminal assembly 50 is preferably configured in a circular arc fashion to match up with the curvature of the pattern of the disposed diodes 44 and 48 and the configuration of the plate 49. A single-piece electrical conductor 51 is preferably insert molded into the terminal assembly 50. The electrical conductor 51 is preferably copper, but other suitably conductive materials may be employed. After insert molding the terminal assembly 50, it is stamped to separate the conductor 51 into appropriate sections for electrical connections with the diodes 44 and 48, as well as the stator wires. In an exemplary embodiment, the conductor 51 is a ribbon type terminal assembly used for the stator 4 and the diodes 44 and 48 electrical connections, which affords a low cost solution.

The terminal assembly 50, the plate 49, the separator 54, and the SRE frame 20 are clamped via common fasteners 56 (see FIG. 8) that pilot through a plurality of cylindrical walls 57 configured in the terminal assembly 50 securing the resulting assembly. Each of the cylindrical walls 57 provides electrical isolation for the corresponding fastener 56 extending therethrough from the plate 49. Each of the fasteners 56 are directly engaged with the SRE frame 20, such as for example threaded engagement where the fastener 56 is preferably a mechanical faster such as a threaded bolt, for example. One common fastener 56 used throughout minimizes cost and the potential for error in the assembly plant where different fasteners can be mixed.

Figure 5:
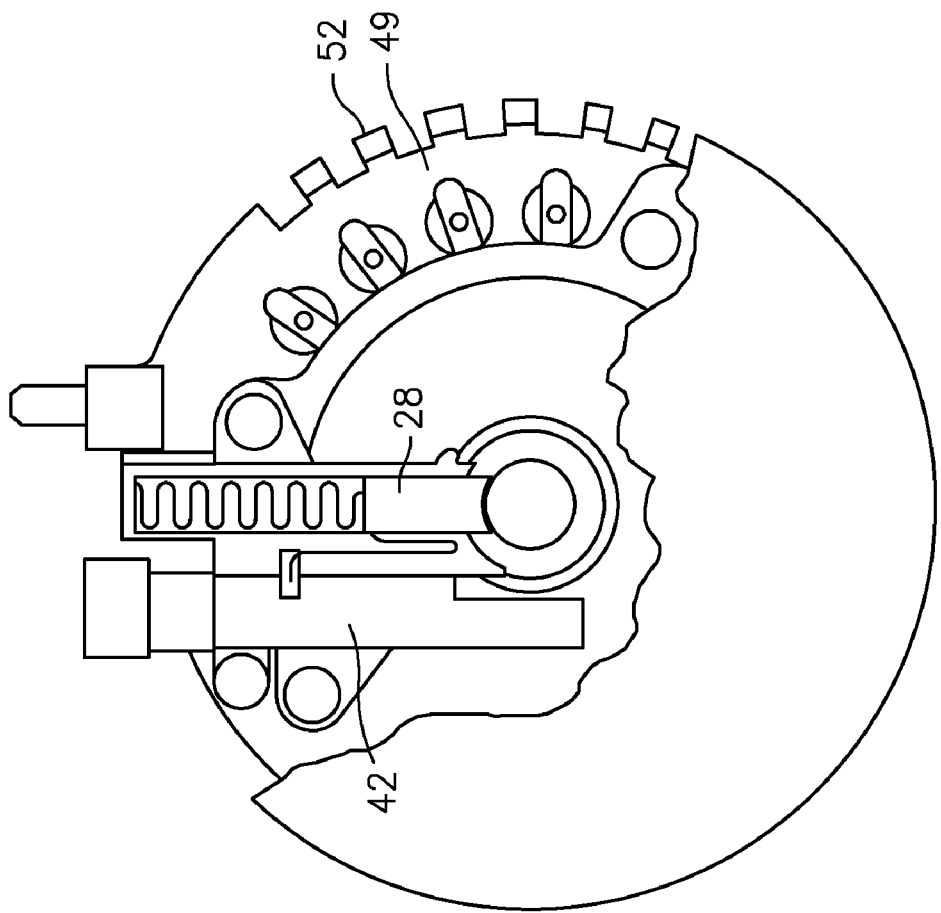
FIG. 5 is a top plan view of a positive heat sink without heat sink fins and a top plan view a positive heat sink with heat sink fins (52)
Figure 5:
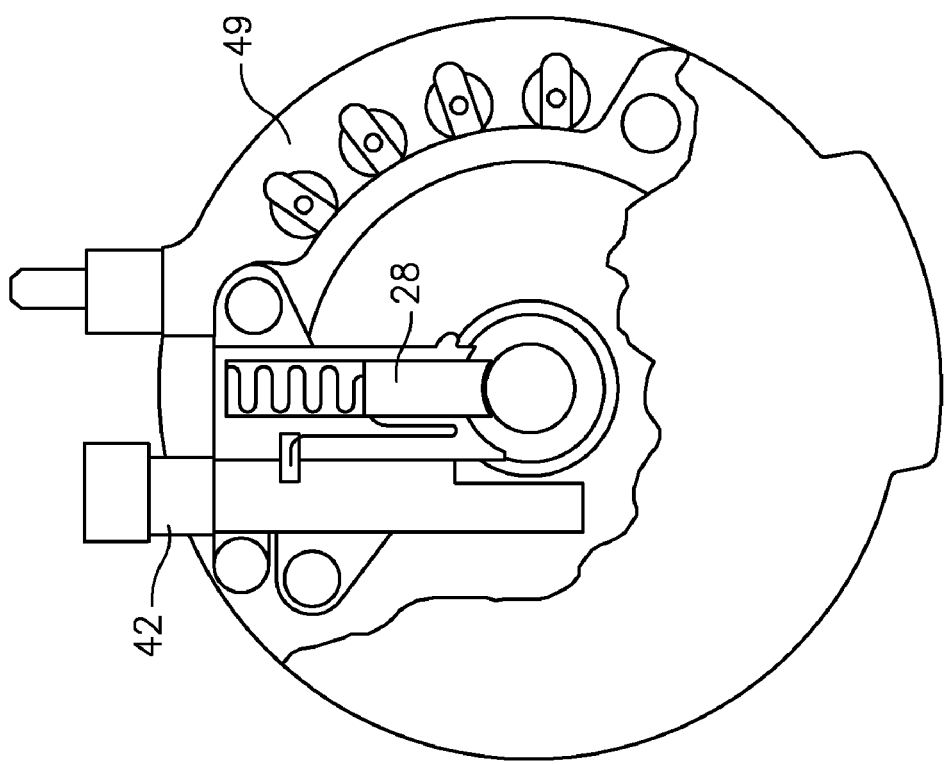
Figure 6:
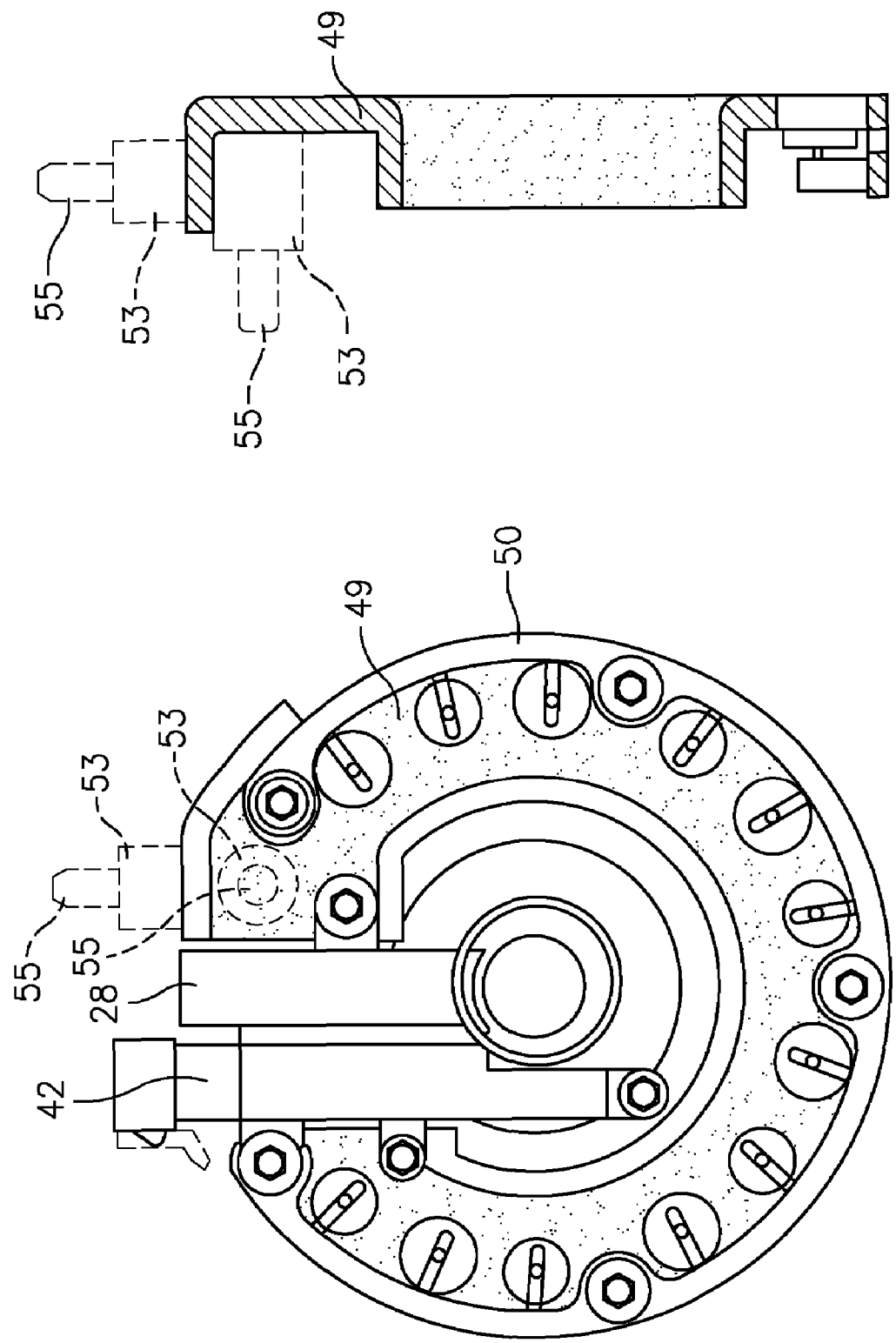
FIG. 6 is a top plan view and a cross section view of a positive heat sink having a B+ stud (55) shown in axial and radial positions depicted with phantom lines.

Referring now to FIGS. 5, 14, and 15, the rectifier assembly 40 is preferably cooled by multiple streams of air that flow across the plate 49 and the negative heat sink or the SRE frame 20 and through various air passages configured therein. Due to the plate 49 being spaced from the SRE frame 20, air flows not only axially down through slots proximate the finned area defined by fins 52 on the plate 49, but also flows radially across both faces defining the SRE frame 20 and the plate 49 before entering the SRE frame 20 inlet. The SRE frame 20 is also cooled by this radial movement of air but then also by the radial movement of air within the SRE frame 20 as the air flows through the SRE frame 20 and across an inside face of the SRE frame 20 before exiting in a radial fashion. The fan 34 or 36, illustrated in FIG. 1, is preferably employed to increase airflow at the slip ring end of the electric machine. The fan 34 or 36 is preferably configured to draw air into the SRE frame 20 toward the electronic package residing therein.

The regulator assembly 42 electrically connects to the plate 49 with a first terminal 58 extending therefrom illustrated in FIG. 3, a stator phase field negative (F−) terminal 61 (see FIG. 4) extending from terminal assembly 50, the SRE frame 20 with terminal 59 extending therefrom and the brush holder assembly 28 via field positive (F+) terminal 60.

In addition, the regulator 42 is structurally attached to the SRE frame 20 generally indicated at 61 and to the brush holder 28. Inside the regulator 42 is an electronic circuit and devices that control the operation of the electric machine. The regulator 42 is electrically connected to component wiring for signal type information through either a pinned connector body 62 that is integral with the regulator 42 or a stud type connection 63 disposed at one end that allows an external connector body to either plug into the regulator 42 or threadably engage the studs 63 for proper electrical interfacing.

The regulator 42 is electrically and structurally connected to the plate 49 that is at a battery B+ voltage potential. The metallic spacer 53 is pressed over the B+ stud 55. When the customer attaches an external battery cable to the B+ stud 55, an external nut (not shown) is threadably fastened on the stud 55.

Figure 9:
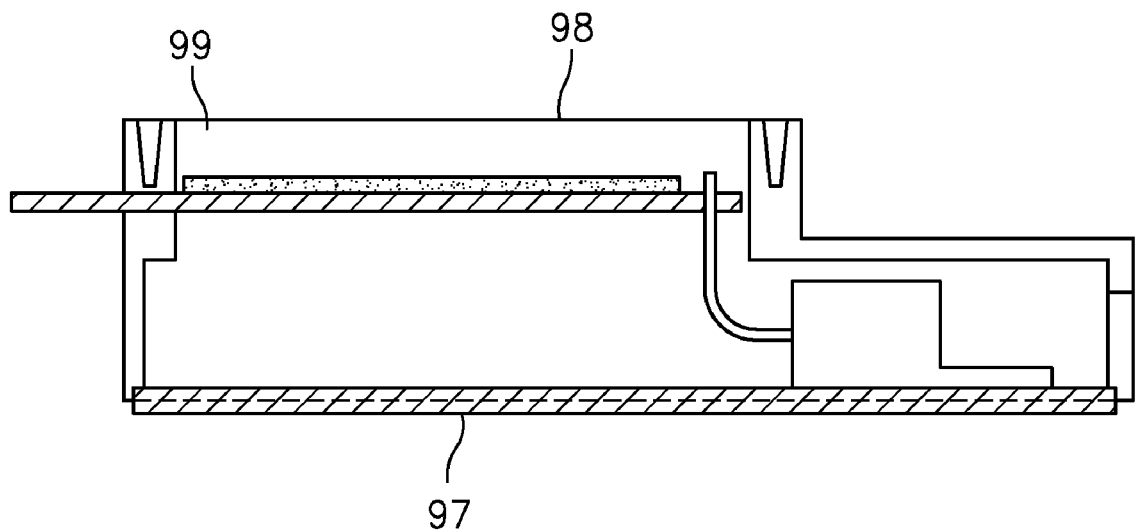
FIG. 9 is a cross section view of the regulator of FIG. 4 illustrating opposing heat sinks defining opposing sides of the regulator.

FIG. 9 further illustrates a cross section view of the regulator 42 having a first side 97, a second side 98, and a heat sink 99.

Figure 7:
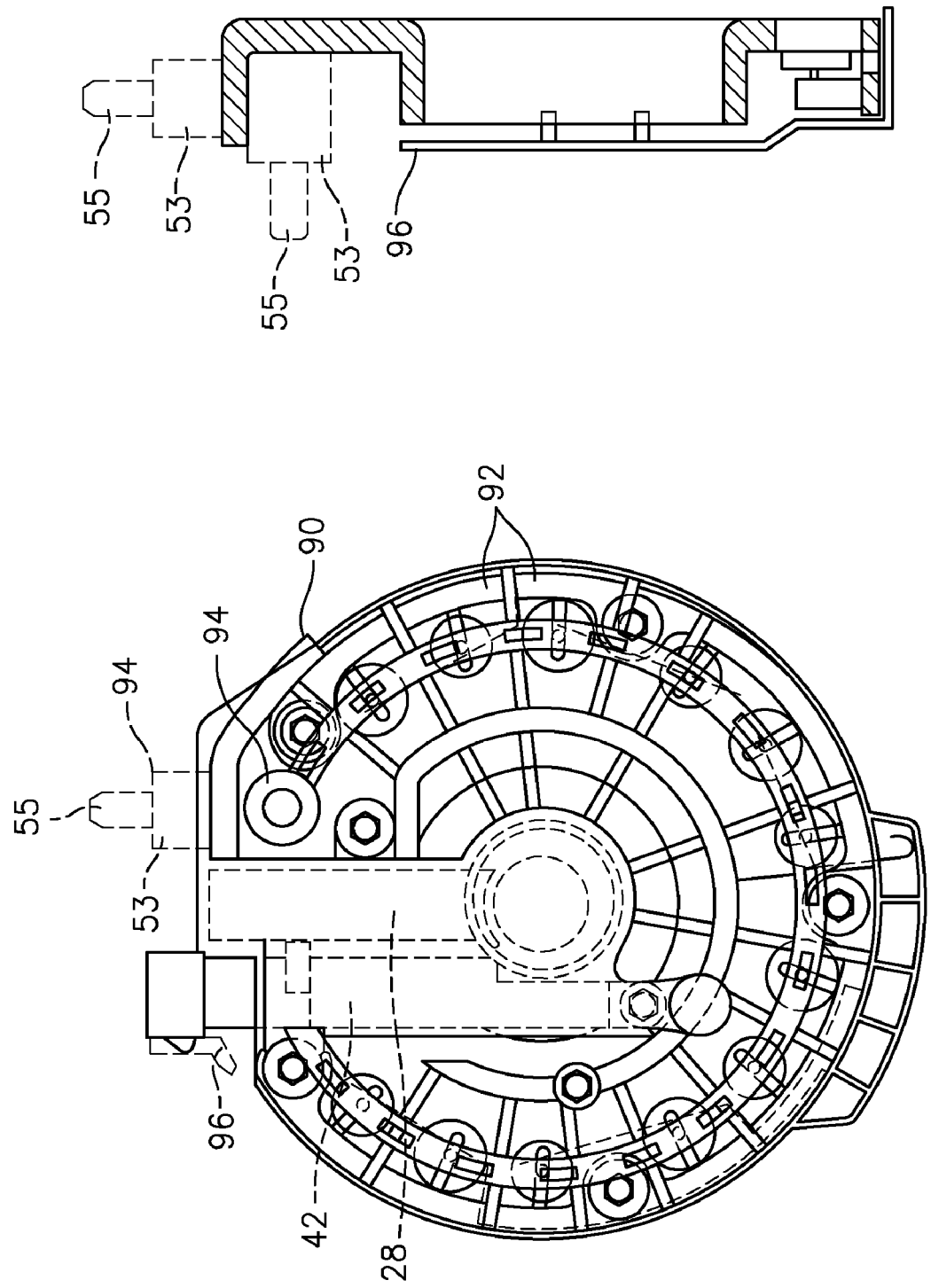
FIG. 7 is a top plan view and a cross section of the positive heat sink of FIG. 6 illustrating a cover (90) operably coupled thereto.

Referring now to FIG. 7, the entire electronic package is shielded by a cover 90 that extends across the entire electronic package and attaches to the SRE frame 20. The cover 90 includes a plurality of vents 92 configured in a top surface defining the cover 90 to allow airflow therethrough to the electronic package disposed below the top surface. The cover 90 may be directly attached to the SRE frame 20 by employing a snap fit feature. The cover 90 is further configured having a cut away section generally indicated at 96 to allow the connector assembly 62 or 63 therethrough for electrical connection with an external connector body. The top surface of the cover 90 is also configured having an aperture 94 to allow the spacer 53 and the B+ stud 55 to extend therethrough for electrical connection with a battery as discussed above.

The above described invention provides a geometrical layout of the various components that yields a very effective thermal package for the rectifier and a structural design of the assembled components produces a very robust assembly resistant to the effects of vibration.

Figure 4:
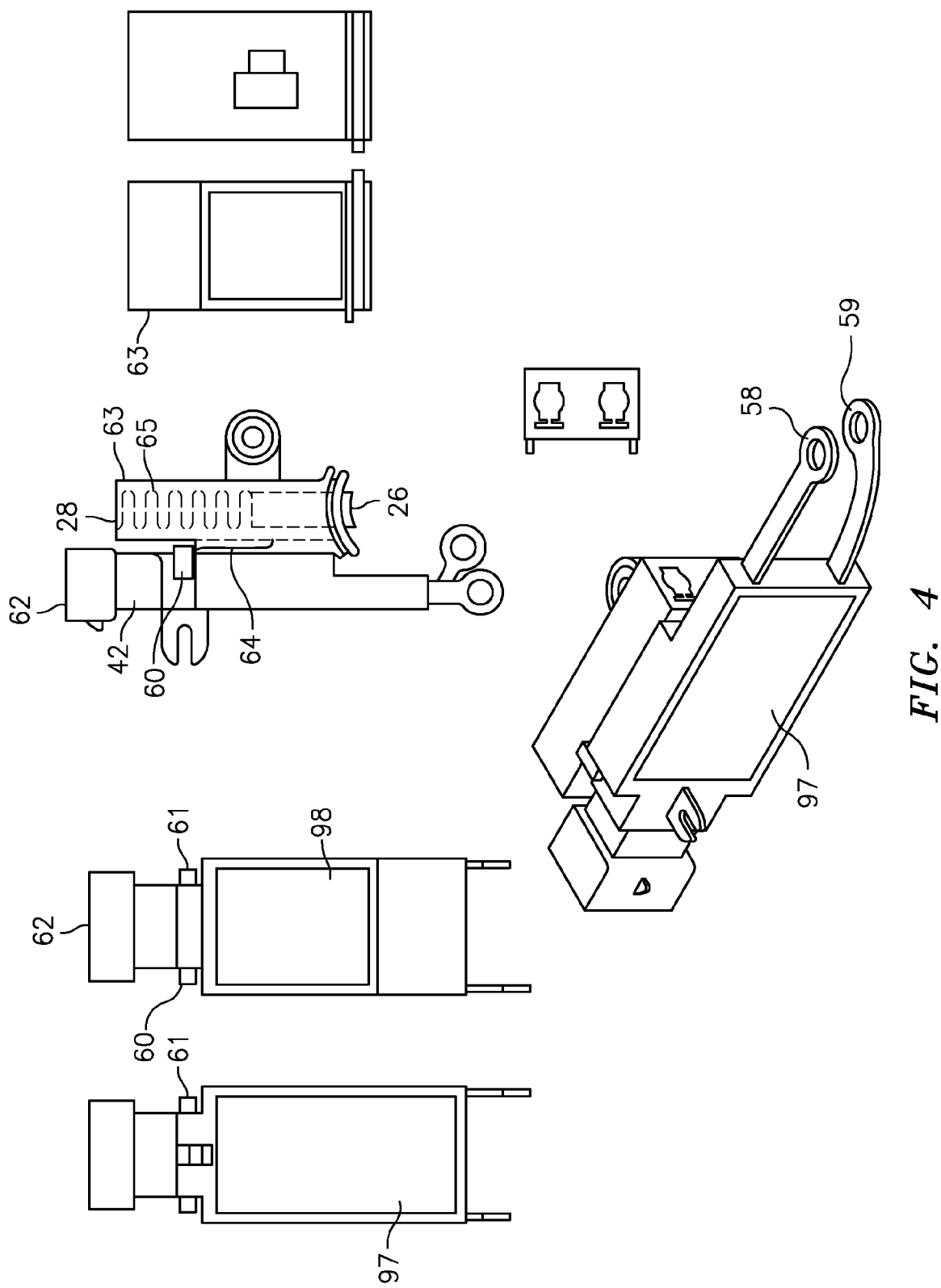
FIG. 4 illustrates various views of regulator (42) and brush holder (28)

Referring to FIGS. 3 and 4, the regulator 42 and the blush holder 28 are, in their final configuration, attached to each other forming an integral body. The regulator 42 is oriented such that the first side 97 faces away from the shaft 14, and the second side 98 faces the blush holder 28. Furthermore, the first side 97 and the second side 98 of the regulator 42 are both perpendicular to the first face 33 and to the second face 35 of the SRE frame 20. The brush holder 28 includes a plastic molded body 63, two carbon brushes 26 with attached copper shunts 64 that connect to the regulator 42 via terminal 60, two helical springs 65 to force the carbon brushes 26 in contact with rotating copper slip rings 24 located on the rotor 14. The regulator 42 and the brush holder 28 are fast to each other in a parallel back to back fashion such that the second face 98 of the regulator 42 mates to brush holder 28 and is equidistant from each of the helical springs 65 and carbon brushes 26, thus minimizing interconnects there between and providing efficient space utilization. Furthermore the first face 97 and second face 98 of the regulator 42 are also parallel to and equidistant from the direction of brush travel. The brush holder 28 is secured to the SRE frame 20 through a fastening screw 93 and through attachment to the regulator 28. In an exemplary embodiment, the fastening screw 93 is dimensioned and configured as a common fastener 56. The orientation of the regulator 42 also allows for the regulator heat sink 99 to be put directly in the main air flow stream for cooling.

Figure 10:
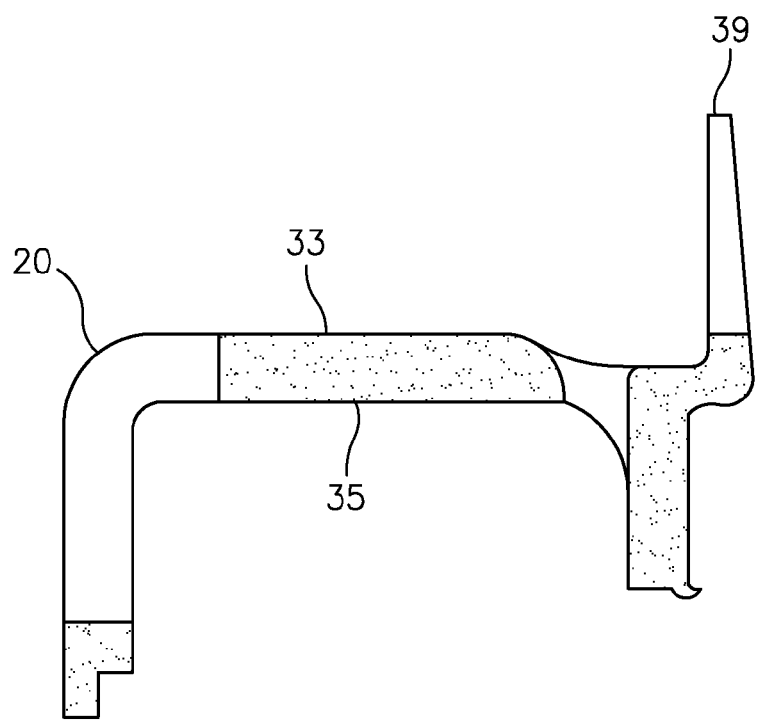
FIG. 10 is an enlarged partial cross section view of a SRE frame illustrating a cast shield extending therefrom to isolate a slip ring region from electronic components of the electronic package.
Figure 11:
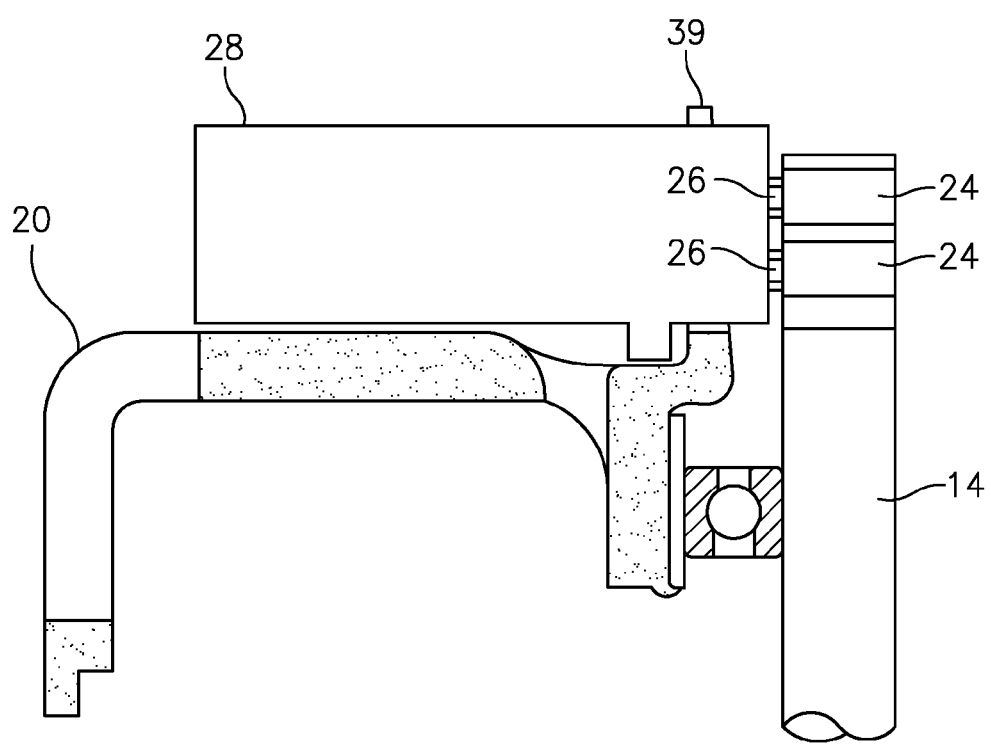
FIG. 11 is an enlarged partial cross section view of the SRE frame of FIG. 10 with a brush holder in communication with slip rings (24) on a rotor shaft.
Figure 13:
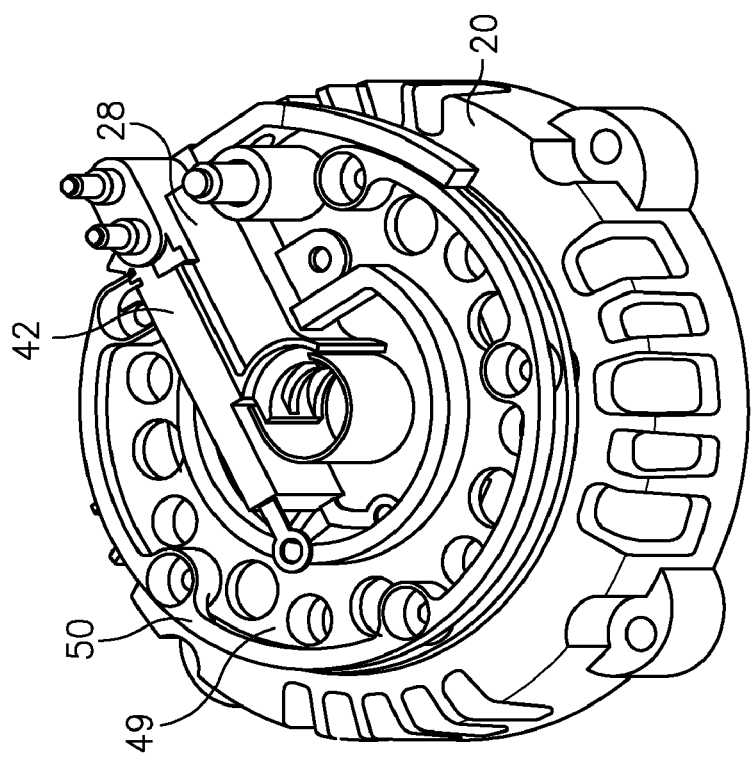
FIGS. 12 and 13 are perspective views of an assembled rectifier assembly having a positive and negative heat sink, terminal assembly, B+ stud, brush holder and regulator.
Figure 12:
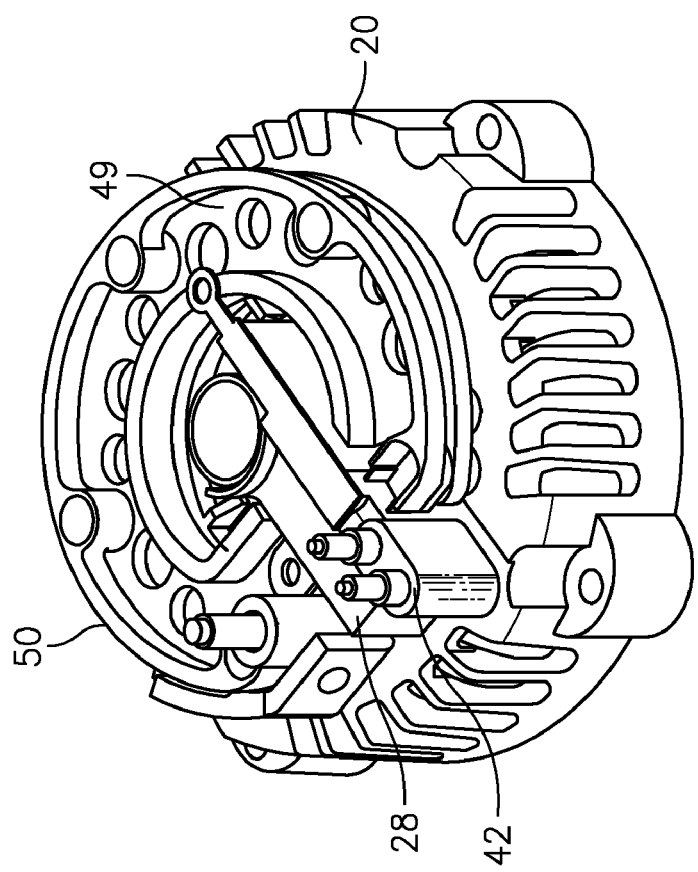

The SRE frame 20 of the electric machine serves as a structural element, an electrical ground path for the rectifier 40, and a heat sink for the rectifier 40. The SRE frame 20 also houses the rear bearing 21 of the electric machine. The SRE frame 20, through a cast wall 39, illustrated in FIGS. 10 and 11, surrounding the slip rings 24, provides shielding against external contaminants such as road splash for the slip rings 24 and brushes 26, as well as heat sinking for the rear bearing 21 through the convective surfaces of the cast wall 39. Furthermore, the internal fans 34 and 36 provide for airflow along the convective surfaces of the cast wall 39.

The above described electronic package provides a single compact package for use with six and twelve diode configurations, and between light duty and heavy duty or off-road applications. Exemplary embodiments described herein further provide the flexibility to adapt the thermal cooling of the rectifier 40 or length of the brushes 26 to match a given application.

The above described exemplary embodiments uses low cost components and one common assembly footprint that can be common worldwide and used in six to twelve diode configurations. This will drive down direct material cost, tooling cost and intangible costs that are associated with having a common design and assembly process. The electronic package in accordance with exemplary embodiments also affords high thermal capability in comparison to other competitive designs.

Referring to FIGS. 16 and 17, the rear bearing 21 includes an outer race 102 that is retained in the SRE frame 20 of an electric machine. The SRE frame 20 of the electric machine is typically die cast aluminum while the rear bearing 21 (e.g., typically a deep groove ball bearing) is steel. In an exemplary embodiment, the outer race 102 is retained with the SRE frame 20 using a retaining ring 110.

The retaining ring 110 is a steel, cylindrical shaped part that is inserted into a machined bearing bore 112 of the SRE frame 20. After the ring 110 is inserted in the bore 112, a portion 114 of the SRE frame 20 is either spun over or staked over to create a small lip 116 that retains one edge 118 defining the steel ring 110. An opposite edge 120 defining the ring is retained by the geometry of a cast wall 122 of the SRE frame 20. The steel ring 110 is sized such that the outer race 102 of the bearing 21 is held sufficiently tight such that the outer race does not spin relative to the SRE frame 20 during electric machine use, but does allow for relative axial movements caused by the thermal expansion and contraction of the electric machine 10. This requires that the sliding force between the retaining ring 110 and the bearing 21 to be roughly in the range of between about 30 to about 300 pounds of force (lbf). The retaining ring 110 provides a low cost approach while maintaining long term dimensional stability and improved bearing heat dissipation.

In addition to retaining the rear bearing 21, a plurality of cooling vents or channels 130 are cast in bore 112 of the SRE frame 20. The channels 130 allow outside air to be pulled into the slip ring region 37 and then exit through these channels and into the cooling fans 36. For the carbon brushes 26, as used in a typical electric machine, it is important to bring fresh air into the slip ring area 37 since fresh air contains small amounts of moisture that is needed to develop the proper patina on a surface defining the slip rings 24. By casting the channels 130 into the SRE frame 20 as shown, the slip rings 24 can still be protected from outside road splash and debris, and at the same time, a small amount of air can constantly be drawn through the channels 130 and into the slip ring area 37.

In alternative embodiments, an optional wave washer 132 can be added to the rear bearing assembly between the bottom of the cast bearing bore 112 in the SRE frame 20 and the outer race 102 of the bearing 21. The wave washer 132 functions to increase axial stiffness of the rotor/electric machine assembly and increase its natural frequency. On some applications, this is a desirable feature to reduce noise.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A bearing package for an electrical machine comprising:
    a slip ring end (SRE) frame defining one end of a housing configured for mounting a rotor therein so as to be rotatable, said SRE frame having a bearing bore configured therein with a plurality of channels extending a length of the bearing bore, the channels providing fluid communication between an ambient and a slip ring region;
    a bearing having an outer race and an inner race, said inner race operably coupled with a rotor shaft of the rotor; and a steel retaining ring intermediate the bearing bore of the SRE frame and the outer race, the steel retaining ring retained in said bearing bore by one of spinning over and staking over a portion of an edge defining the bearing bore on a corresponding portion of an exposed edge defining the steel retaining ring without obstructing the fluid communication.

2. The bearing package of claim 1, wherein the channels are circumferentially spaced apart about the bearing bore, the channels are configured to allow fresh air from the ambient to the slip ring region while limiting at least one of road splash and debris from entering the slip ring region.

3. The bearing package of claim 1, further comprising:
a wave washer disposed intermediate an internal edge of the outer race and a wall increase axial stiffness or increase a natural frequency between the rotor shaft and the SRE frame, or both.

4. The bearing package of claim 1, wherein the steel retaining ring has substantially constant wall thickness.

\* \* \* \* \*